Figure 1:
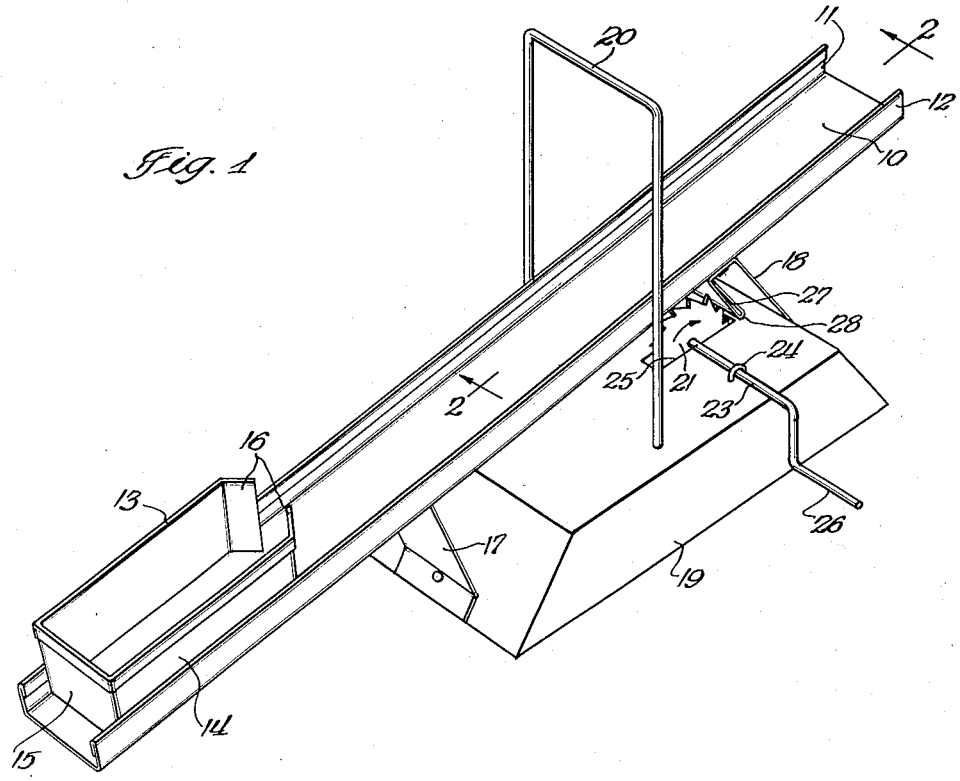

Nov. 18, 1952 — A. E. MAY, JR — 2,618,377
TOY CONVEYER
Filed May 18, 1951

INVENTOR.
Arthur E. May Jr.
BY Buckhorn and Cheatham
ATTORNEYS

Patented Nov. 18, 1952

2,618,377

UNITED STATES PATENT OFFICE 2,618,377

TOY CONVEYER

Arthur E. May, Jr., North Bend, Oreg.

Application May 18, 1951, Serial No. 227,001

3 Claims. (Cl. 198—220)

My present invention relates to conveyor mechanism, the invention having particular reference to toys for simulating the action of large commercial installations, but the principles thereof being applicable to large commercial installations. The present invention has for its object the provision of improved means for jogging or rapidly reciprocating an inclined trough whereby pulverulent or granular material may be caused to climb the bottom of the trough. In the illustrated form of the invention the trough is provided with a hopper at its lower end in which material may be placed in contact with the lower end of the bottom of the trough. The trough is supported upon springs whereby the application of repeated sharp blows applied to the trough in the longitudinal direction thereof will cause the trough to reciprocate rapidly, thus causing the material to climb up the bottom of the trough. In accordance with the present invention the blows are imparted thereto by a cam mechanism having a plurality of cam teeth which may be rapidly rotated, the teeth of the cam striking a relatively short, stiff spring depending from the bottom of the trough. The principle of the present invention is not thoroughly understood, but it seems that the spring striking the cam imparts a plurality of secondary vibrations to the trough which prevent the material from sliding down the inclined trough. It is a fact that the present invention elevates the material in a more rapid, more efficient manner than other devices of a similar character comprising a trough mounted upon springs to which rapid reciprocations are imparted by direct hammer blows or other similar jogging mechanism.

The objects and advantages of the present invention may be more readily understood by reference to the accompanying drawings wherein like numerals refer to like parts throughout.

Figure 2:
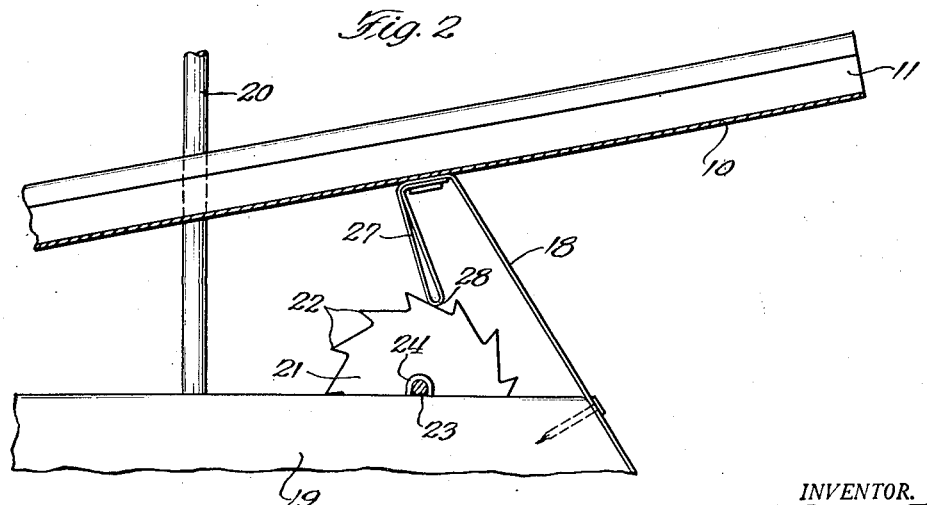

In the drawings,

Fig. 1 is a view in perspective of a toy conveyor manufactured in accordance with the present invention; and Fig. 2 is a partial vertical section taken substantially along line 2—2 of Fig. 1.

The invention comprises a trough including a bottom wall 10 and opposed side walls 11 and 12, the upper edges of which are flanged back upon themselves in order to eliminate sharp edges which might cut the fingers of the users. A hopper comprising side walls 13 and 14 and a lower end wall 15 is mounted upon the lower end of the trough whereby pulverulent or granular materials may be maintained in contact with the lower end of the bottom wall 10 of the trough. The upper ends of side walls 13 and 14 terminate in inwardly directed, forwardly inclined wings 16 between which there is provided a central space to permit the exit of a limited quantity of the material at each reciprocation of the trough. The trough is mounted upon a pair of supporting springs 17 and 18 which are of substantially equal length and strength, the springs being inclined and having their upper ends firmly attached to the bottom wall 10 of the trough. The lower ends of the springs are firmly attached to a supporting member 19 at different elevations thereof so that the free length of each of the springs is substantially the same. A handle 20 comprises a stiff wire bent into an inverted U shape and mounted upon the support 19 in position to straddle the trough so as to provide means by which the toy may be carried from place to place and also against which pressure may be exerted to hold the base support in firm contact with the floor.

The trough is caused to rapidly reciprocate in a longitudinal direction by a multiple toothed cam and a relatively stiff spring having one end attached to the bottom of the trough and its free end in position to be engaged by the teeth of the cam as it is rotated. The cam comprises a disclike member 21, having a plurality of rearwardly facing steps 22 thereon, which is fixed to a transversely extending shaft 23 lying in a horizontal plane across the top of the base 19 and maintained thereon by staples 24. The cam rotates in a trough 25 cut into the top of the base support and the shaft 23 is provided with a crank 26 extending beyond the edge of the base support to supply means for rotating the cam. A relatively stiff short spring 27 is firmly fixed to the bottom of the trough, in this instance the spring 27 being provided by doubling the end of the spring 18 back upon itself. The spring 27 is about half the length of the spring 18 and is of considerably greater stiffness. The doubling of the spring member upon itself provides a rounded lower end portion 28 which is less likely to be worn through by engagement with the cam teeth 22.

In operation the cam 21 is rapidly rotated, each tooth 22, upon striking the end of the actuating spring 27, causing the trough to be reciprocated in its longitudinal direction. When the spring 27 slips past the end of each tooth 22, the trough suddenly jumps rearwardly, leaving the material in advanced position by virtue of its inertia. This primary vibration is repeated for each passage of a cam tooth, whereby the material is progressed stepwise up the trough. However, the spring 27 vibrates at its own period and imparts secondary vibrations to the trough which are imposed upon the primary vibrations created by the cam teeth. These secondary vibrations are of great effect in causing the general advance of the material up the trough. The net effect of the two types of vibrations is to cause the material to move smoothly and continuously as long as the crank is rotated. Pulverulent material such as sand, or powdered material such as flour and talc, placed in the hopper at the lower end of the conveyor will leave the hopper through the open upper end thereof and spread across the bottom of the conveyor in a thin sheet which moves upward along the bottom of the conveyor in a continuous manner as long as the crank 26 is rotated. I am aware of the fact that conveyors mounted upon springs to which a jogging motion is imparted by a hammer or by the actuation of an eccentric or the like are old, but it is my discovery that the impartation of reciprocation to the trough through the medium of a stiff spring member whereby secondary vibrations are imparted to the conveyor results in an improved action.

Having illustrated and described one embodiment of the invention it should be apparent to those skilled in the art that the same permits of modification in arrangement and detail. I claim as my invention all such modifications which come within the true spirit and scope of the appended claims.

I claim:

1. A toy conveyor mechanism comprising an elongated trough, a material holding hopper mounted on said trough at the lower end thereof for maintaining material against the bottom of said trough, said hopper having an exit opening in its upper end wall, a base member, a plurality of spring supports connecting said trough to said base member, said spring supports being of substantially the same length but being connected to said base member at different elevations thereof whereby said trough is maintained at an inclination with said hopper at its lowermost end, a shaft mounted on said base member, means for rotating said shaft, a multiple-toothed cam coaxially mounted upon said shaft, said shaft extending in a direction normal to the longitudinal axis of said trough and lying in a horizontal plane and said cam lying in a vertical plane directly beneath said trough, and an actuator spring depending from said trough and having its lower end in position to be successively engaged by the teeth of said cam.

2. A toy conveyor mechanism comprising an elongated trough, a material holding hopper mounted on said trough at the lower end thereof for maintaining material against the bottom of said trough, said hopper having an exit opening in its upper end wall, a base member, a plurality of spring supports connecting said trough to said base member, said spring supports being of substantially the same length but being connected to said base member at different elevations thereof whereby said trough is maintained at an inclination with said hopper at its lowermost end, a shaft mounted on said base member, means for rotating said shaft, a multiple-toothed cam coaxially mounted upon said shaft, said shaft extending in a direction normal to the longitudinal axis of said trough and lying in a horizontal plane and said cam lying in a vertical plane directly beneath said trough, and an actuator spring depending from said trough and having its lower end in position to be successively engaged by the teeth of said cam, said actuator spring being shorter than said supporting springs and having less resiliency than said supporting springs.

3. A toy conveyor mechanism comprising an elongated trough, a base, a plurality of spring supports connecting said trough to said base, said spring supports being of substantially the same length but being connected to said base at different elevations whereby said trough is maintained at an inclination, means to supply materials to the lower end of said trough, a shaft mounted on said base, means for rotating said shaft, a multiple-toothed cam coaxially mounted upon said shaft, said shaft extending in a direction normal to the longitudinal axis of said trough and lying in a horizontal plane and said cam lying in a vertical plane directly beneath said trough, and an actuator spring depending from said trough and having its lower end in position to be successively engaged by the teeth of said cam.

ARTHUR E. MAY, Jr.

REFERENCES CITED

The following references are of record in the file of this patent:

UNITED STATES PATENTS

| Number | Name | Date |
|---|---|---|
| 315,824 | Patten | Apr. 14, 1885 |
| 1,019,555 | Taylor | Mar. 5, 1912 |
| 2,100,878 | Shallock | Nov. 30, 1937 |